US012342008B2

(12) United States Patent
Brown et al.

(10) Patent No.: US 12,342,008 B2
(45) Date of Patent: Jun. 24, 2025

(54) ADDRESSABLE CONTENT ITEM INSERTION

(71) Applicant: Comcast Cable Communications, LLC, Philadelphia, PA (US)

(72) Inventors: Gregg Brown, Atlanta, GA (US); Stuart Kurkowski, Denver, CO (US); Neill Kipp, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/942,798

(22) Filed: Sep. 12, 2022

(65) Prior Publication Data

US 2023/0091238 A1 Mar. 23, 2023

Related U.S. Application Data

(60) Provisional application No. 63/242,913, filed on Sep. 10, 2021.

(51) Int. Cl.
*H04N 21/234* (2011.01)
*G11B 27/036* (2006.01)
*H04N 21/25* (2011.01)
*H04N 21/258* (2011.01)
*H04N 21/2668* (2011.01)
(Continued)

(52) U.S. Cl.
CPC ..... *H04N 21/23424* (2013.01); *G11B 27/036* (2013.01); *H04N 21/812* (2013.01)

(58) Field of Classification Search
None
See application file for complete search history.

(56) References Cited

U.S. PATENT DOCUMENTS

2007/0118425 A1* 5/2007 Yruski ............... G06Q 30/0264
725/32
2011/0145856 A1* 6/2011 Agarwal .......... H04N 21/25435
725/32
(Continued)

OTHER PUBLICATIONS

Emarketer, Linear addressable TV ad spending will grow 33.1% this year, https://www.emarketer.com/content/linear-addressable-tv-ad-spending-will-grow-33-percent-this-year.
(Continued)

*Primary Examiner* — Brian T Pendleton
*Assistant Examiner* — Jean D Saint Cyr
(74) *Attorney, Agent, or Firm* — Banner & Witcoff, Ltd.

(57) ABSTRACT

Systems, apparatuses, and methods are described for identifying addressable advertisement slots in media/video streams and utilizing the addressable advertisement slots. The identifying and/or the utilizing may be based on metadata associated with the media/video streams and/or viewers/audiences associated with different distributors/operators. The metadata, which may be collected from a content provider or a third-party suppliers, may be provided, via out-of-band signaling, to the different distributors/operators. The different distributors/operators may use information in the metadata to use identified addressable advertisement slots (e.g., by inserting different advertisements specifically targeted to those viewers/audiences associated with a particular distributor) and potentially generate a higher cost per thousand impressions (CPMs).

20 Claims, 8 Drawing Sheets

(51) Int. Cl.
  *H04N 21/44*    (2011.01)
  *H04N 21/442*   (2011.01)
  *H04N 21/45*    (2011.01)
  *H04N 21/454*   (2011.01)
  *H04N 21/81*    (2011.01)
  *H04N 21/8355*  (2011.01)

(56) References Cited

U.S. PATENT DOCUMENTS

2020/0204849 A1* 6/2020 Loheide ............. H04N 21/2187
2021/0368221 A1* 11/2021 Loheide ............... H04N 21/812

OTHER PUBLICATIONS

Freewheel, https://www.freewheel.com/.
Google DoubleClick for Publisher (DFP). https://www.google.com/ads/publisher/.
On Addressability, http://www.onaddressability.com/.
Project OAR, https://projectoar.org/.
SCTE 35, Digital Program Insertion Curing Message for Cable, 2020. https://scte-cms-resource-storage.s3.amazonaws.com/ANSI_SCTE-35-2020-1619708851007.pdf.
SCTE 224, ESNI, Event Scheduling and Notification Interface 2021. https://scte-cms-resource-storage.s3.amazonaws.com/SCTE-224-2021-1620314764331.pdf.
SCTE 268, Operational Practice on the Usage of SCTE 224 for Advertising Information, https://scte-cms-resource-storage.s3.amazonaws.com/SCTE-268-2021_with-errata-notice-1621910364946.pdf.
W3C XML Base (Second Edition). W3C Recommendation Jan. 28, 2009. http://www.w3.org/TR/xmlbase/.
W3C XML Schema Part 2: Datatypes Second Edition. W3C Recommendation Oct. 28, 2004. http://www.w3.org/TR/xmlschema-2/.
W3C XML Path Language (XPath) 2.0 (Second Edition). W3C Recommendation Dec. 14, 2010. http://www.w3.org/TR/xpath20/.

* cited by examiner

ADDRESSABLE CONTENT ITEM INSERTION

CROSS-REFERENCE TO RELATED APPLICATION

This application claims the benefit of U.S. Provisional Application No. 63/242,913, filed on Sep. 10, 2021. The above-referenced application is hereby incorporated by reference in its entirety.

BACKGROUND

Television advertising (e.g., linear television advertising) has been practiced the same way for many years. In the past, available advertisement time may be allocated between a content provider and a content distributor. For example, a distributor may sell 2 to 3 minutes of advertisements per hour per program and a content provider may sell the rest of an advertisement inventory per program per hour (e.g., approximately 14 to 15 minutes of advertisements). Cablelabs has participated in the creation of standards that allow content providers and content distributors to share advertisement opportunities. Two standards are the Society of Cable Telecommunications Engineers (SCTE) 35 and SCTE 224 standards. There is a need to provide more flexibility in the control, targeting, tracking, and/or sharing of advertisements, advertisement placement opportunities, and advertisement revenue among various parties in order to provide a better user experience, maximize revenue, and allow more flexibility.

SUMMARY

The following summary presents a simplified summary of certain features. The summary is not an extensive overview and is not intended to identify key or critical elements.

Systems, apparatuses, and methods are described for identifying addressable advertisement slots in media/video streams and using the addressable advertisement slots. The identifying and/or the using of the advertisement slots may be based on metadata associated with the media/video streams and/or viewers/audiences associated with different distributors/operators. The metadata, which may be received from a content provider or a third-party suppliers (e.g., creators of advertisements), may convey information including, but not limited to, advertisement rules, addressability rules, and/or audit/execution logs. The information or part of the information may be provided to the different distributors/operators. The different distributors/operators may use the information or part of the information to use identified addressable advertisement slots (e.g., by inserting different advertisements specifically targeted to those viewers/audiences associated with a particular distributor) and potentially generate a higher cost per thousand impressions (CPMs).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

The accompanying drawings, which form a part hereof, show examples of the disclosure. It is to be understood that the examples shown in the drawings and/or discussed herein are non-exclusive and that there are other examples of how the disclosure may be practiced.

Figure 1:
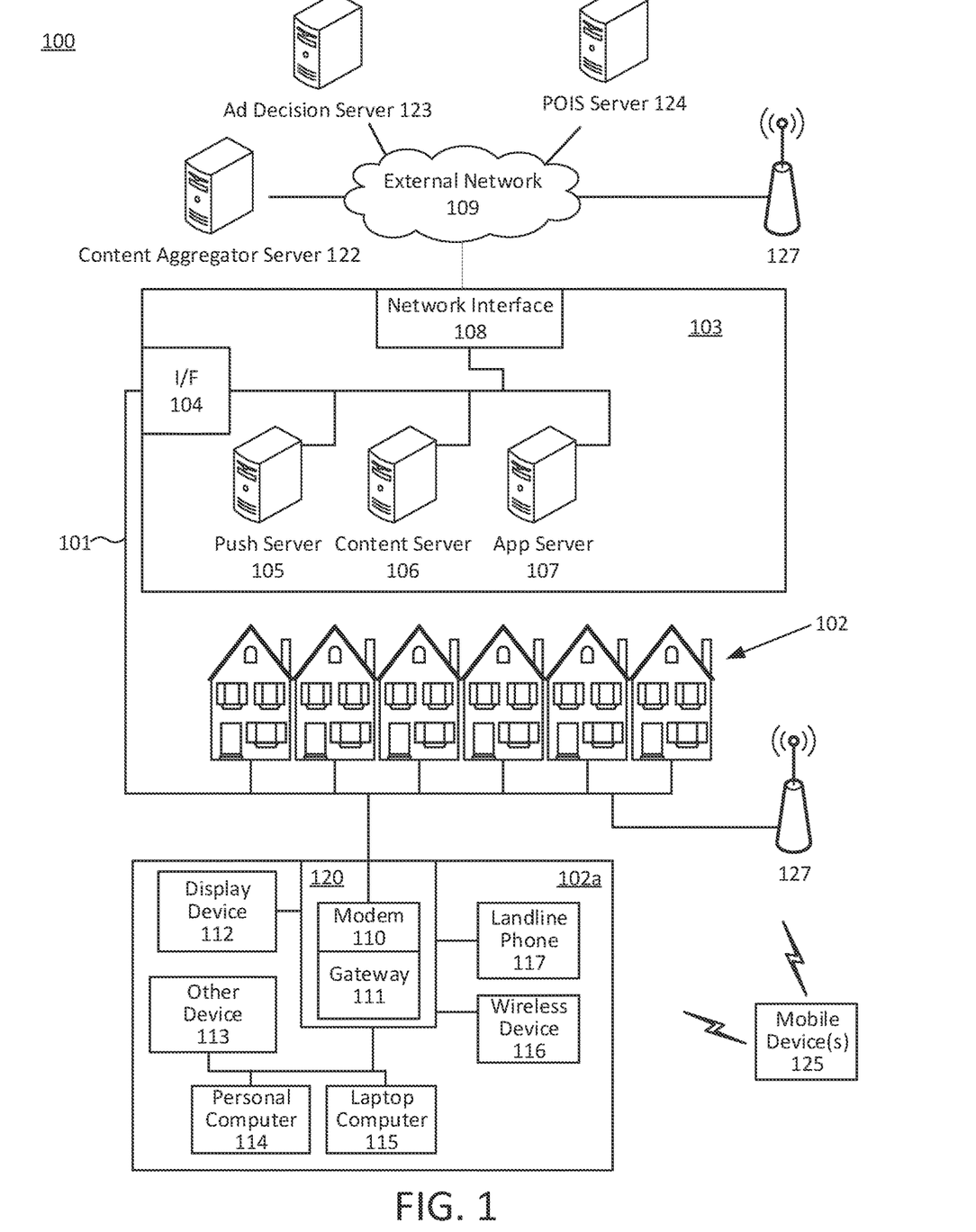
FIG. 1 shows an example communication network.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, additional push, content, and/or application servers, and/or other types of servers. Although shown separately, the push server 105, the content server 106, the application server 107, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein. Also or alternatively, one or more servers may be part of the external network 109 and may be configured to communicate (e.g., via the local office 103) with computing devices located in or otherwise associated with one or more premises 102.

For example, a context aggregator server 122 may communicate with the local office 103 (and/or one or more other local offices), one or more premises 102, one or more access points 127, one or more mobiles devices 125, and/or one or more other computing devices via the external network 109. The context aggregator server 122 may ingest various types of information, generate SCTE 224 type information and send the SCTE 224 type information to other devices, as described below. Also or alternatively, the context aggregator server 122 may be located in the local office 103, in a premises 102, and/or elsewhere in a network.

Additionally, an advertising decision server (ADS) 123 may communicate with the local office 103 (and/or one or more other local offices), one or more premises 102, one or more access points 127, one or more mobiles devices 125, and/or one or more other computing devices via the external network 109. The ADS 123 may receive SCTE 224 type information and determine one or more advertisements based on the SCTE 224 type information, as described below. Also or alternatively, the ADS 123 may be located in the local office 103, in a premises 102, and/or elsewhere in a network.

Additionally, a placement opportunity information service (POIS) server 124 may communicate with the local office 103 (and/or one or more other local offices), one or more premises 102, one or more access points 127, one or more mobiles devices 125, and/or one or more other computing devices via the external network 109. The POIS server 124 may receive a selected advertisement for an advertisement slot, as described below. Also or alternatively, the POIS server 124 may be located in the local office 103, in a premises 102, and/or elsewhere in a network.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
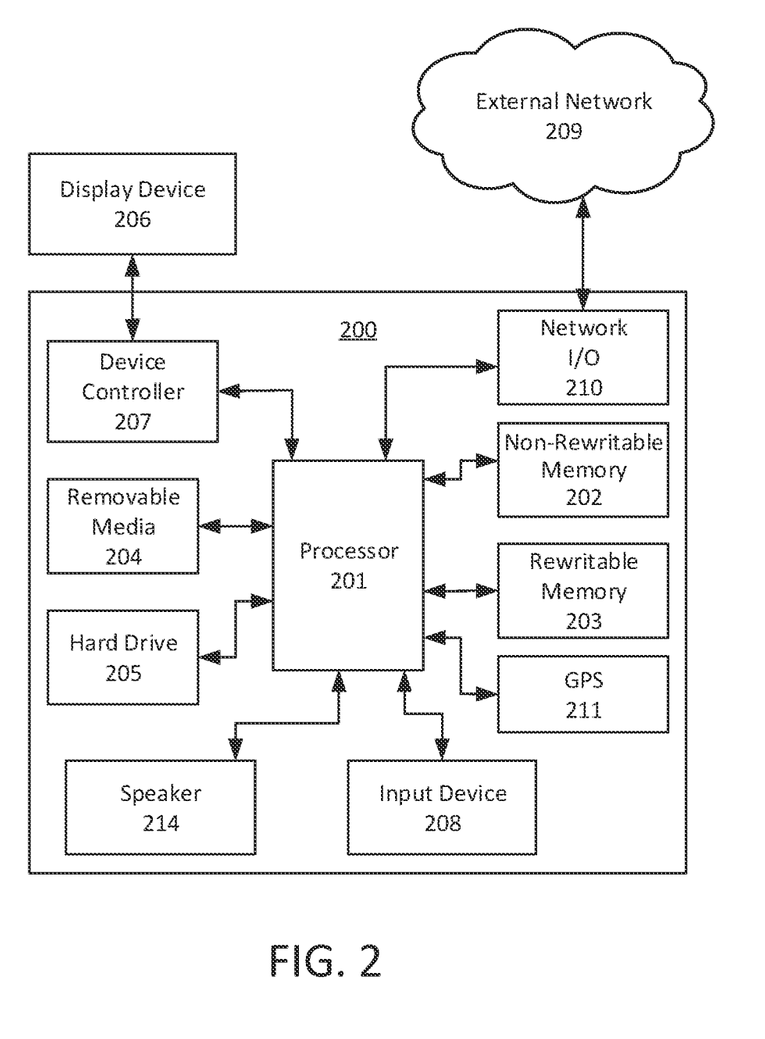
FIG. 2 shows examples of hardware elements of a computing device.

FIG. 2 shows examples of hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109, the context aggregator server 122, the ADS 123, the POIS server 124, and any other computing devices discussed herein). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

A distributor may sell a period of commercials (e.g., 2 to 3 minutes) per hour per program (e.g., local avails), and a content provider may sell the rest of the advertisement inventory per program per hour (e.g., 14 to 15 minutes of commercials). For example, a local avails advertisement inventory may be classified as addressable advertisements, and may be targeted and sold at a local level. The advertisements sold by content providers may be national advertisement campaigns that are "locked and loaded" to be seen by everyone watching that particular program. The content provider-owned national advertisement inventory may be converted into "addressable" advertisement inventory that may be national and/or local and/or shared revenue streams. Addressable advertisements may increase the potential revenue and lead to the growth of this relatively untapped market. Addressable advertisements may comprise replacing advertisements sold on broad age and/or gender demographics with advertising sold on more specific audience definitions (e.g., on a household basis).

Linear advertisement addressability may comprise converting national programmer advertisements to more targeted advertising similar to the local avails sold by distributors. A standardized eco-system for content providers, distributors, and technology providers (e.g., advertising decision services (ADS)) is disclosed to enable automated and trackable addressable advertising.

A standardized eco-system may provide a common addressable advertising interface and control for programmers/content owners/aggregators, content distributors, and others such as television manufacturers and retailers. In one example, Society of Cable Telecommunications Engineers (SCTE) 224 is adapted to identify, to a distributor, which advertisements from a content provider are addressable (e.g., replaceable) and may be replaced, the policy decisions associated with the circumstances under which they may be replaced, and appropriate tracking, reporting, and allocation of revenue from such replacement. SCTE 224 may be adapted for use by content providers to communicate with ADSs advertisement rules regarding how the addressable advertisements should be selected and prioritized vis-a-via other advertisements within a specific advertisement slot. In addition, SCTE 224 may be adapted to enrich advertisement data with, for example, scene information, actor information, or creative metadata in ways that strengthen the visual ties to advertisements and improve the overall effectiveness of selecting the targeted advertisement. A method may comprise ingesting different types of metadata associated with the advertising slot, the advertisement contained in the slot, conflict rules, policies associated with the advertisement slot, digital rights management, and other data and communicating such information of metadata downstream to the content distributor channels (potentially with different policies for different distributor channels). This information may be distributed in various ways and be in-band or out-of-band. For example, it may be communicated using an adaption of SCTE 224 or an out-of-band system such as a policy server, advertisement slot information server, and/or billing server. In one example, ingested information may be distributed by, for example, converting the ingested information to SCTE 224 type information, and identifying addressable advertisement slots and associated advertisement insertion rules based on the SCTE 224 type information.

SCTE 224 is an Event Schedule Notification Interface (ESNI) standard, which provides a defined protocol for carrying machine-to-machine metadata for video. SCTE 224 may be used for addressable advertising such that content providers and distributors may use more targeted advertisements and potentially generate a higher cost per thousand impressions (CPMs). SCTE 224 may be an efficient and effective means for machine-to-machine communication of out-of-band linear rights management (LRM). Additionally, SCTE 224 may be combined with other protocols (e.g., SCTE 35) that trigger in-band signaling, which may allow precision execution of linear rights for content substitution and addressable advertising management. SCTE 224 may be transmitted out-of-band of the video stream (e.g., transmitted via a different channel from a video channel).

SCTE 224 may be used to communicate rules and policies at an audience-based level, thereby providing a substrate to implement addressability. SCTE 224 may be used to identify which slots within the content provider's specific time periods (e.g., 14-15 minutes) per hour for advertising are addressable, and transmit advertisement information specific to those slots. SCTE 224 may provide a mechanism to communicate slot schedules for addressable slots versus national advertisements. SCTE 224 may also enable and/or communicate specific rules for the addressable inventory on behalf of content providers to ADSs associated with distributors.

SCTE 224 objects may be XML (extensible markup language) messages with relevant fields for advertising such as ViewingPolicy actions for advertisement inclusion, exclusion, and/or ADS directives. These XML messages may be managed and/or transmitted with a representational state transfer (REST) interface for exchange between distributors and content providers, via, for example hypertext transfer protocol (HTTP). SCTE 35 markers/signals in a video stream may trigger or otherwise indicate advertisement breaks and/or advertisement slots. The SCTE 224 objects may be tied to SCTE 35 markers/signals based on information included in an SCTE message and an SCTE 35 marker/signal.

Figure 3:
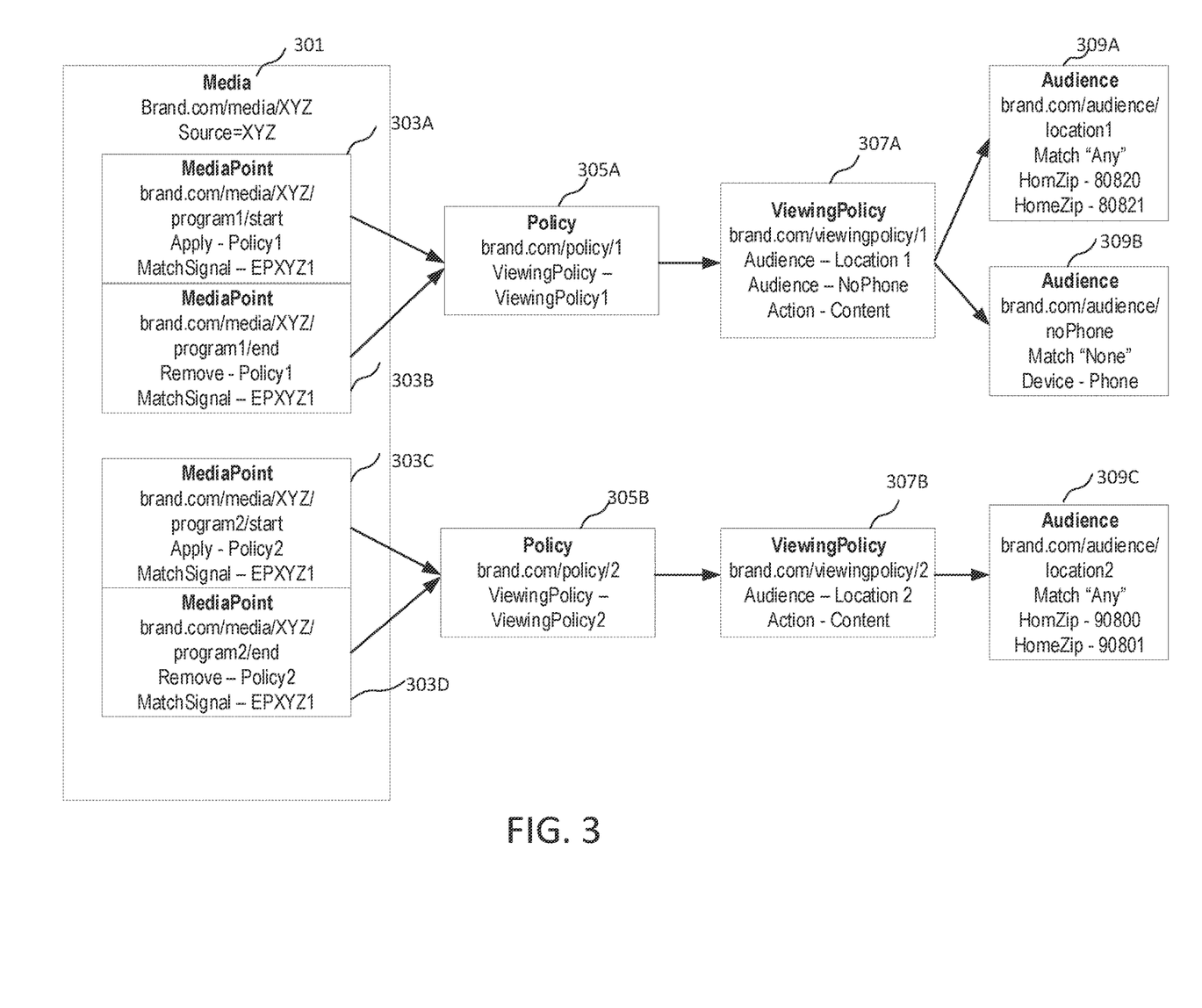
FIG. 3 shows examples of various constructs within SCTE 224.

FIG. 3 shows examples of various constructs within SCTE 224. There may be various (e.g., 5) basic constructs (e.g., object types) within SCTE 224. Each of these constructs may work together to provide a content provider with a means to transmit video rights for content replacement as well as advertising instructions. For example, SCTE 224 may comprise five constructs: Media, MediaPoints, Policy, ViewingPolicy, and Audiences. Additional constructs may be available, and/or other constructs may replace one or more of those five constructs. For example, a Media object 301 may be a top-level container representing a channel (e.g., a linear channel such as WNBC) whose primary function is to carry all the MediaPoints objects. For example, the Media object 301 may comprise an ordered list of MediaPoint objects 303A-303D. The Media object 301 may also comprise key information (e.g., a description and source) for the channel. The Media object 301 may comprise information indicating that the source for the channel is "XYZ."

The MediaPoint objects 303A-303D may describe a point in the Media object 301 when a decision needs to be made and/or action needs to be taken. The point may either be time-based (e.g., a MatchTime attribute in the MediaPoint object) or SCTE 35 marker-based for frame accuracy. A time-based point may indicate the time of a start of a program, an end of a program, a start of an advertisement break, an end of an advertisement break, and/or any time point that a decision needs to be made and/or an action needs to be taken. A signal-based MediaPoint object may comprise a MatchSignal attribute (e.g., element) with XPath matching logic to link the MediaPoint object to the presence of an SCTE 35 marker/signal. For example, the MediaPoint object 303A may comprise a MatchSignal attribute "EPXYZ1" to link the MediaPoint object 303A to an SCTE 35 marker/signal. The MediaPoint objects 303A-303D may use the same MatchSignal because the MediaPoint objects 303A-303D may have an effective and/or expiration window constraining if the MediaPoint objects 303A-303D are evaluated.

If a MediaPoint object (e.g., one of the MediaPoint objects 303A-303D) is triggered, based on a time or signal, the MediaPoint object may either "apply" or "remove" one or more Policy objects that affect the state of output. MediaPoints objects that "apply" a policy may do so until another MediaPoint object explicitly "removes" that Policy or a time out occurred (e.g., based on the duration indicated in the "apply" statement). For example, the MediaPoint object 303A may apply "Policy1" to the state of output.

MediaPoint objects 303A and 303B may correspond to a Policy object 305A and MediaPoint objects 303C and 303D may correspond to a Policy object 305B. A Policy object may be a container for defining a set of ViewingPolicy elements to be acted upon based on this Policy being "apply" or "removed" from a policy stack. The "apply" (e.g., application) of a Policy may comprise putting that Policy on that Media object's stack via first-in-last-out queue, so multiple Policies may be applied at one time. The removal of a Policy may remove the Policy from that stack and out of the state of that Media object. SCTE 224 may comprise explicit rules specifying how to manage the Policy queue in an SCTE 224 execution engine. For example, the policy object 305A may define ViewingPolicy elements "ViewingPolicy1," which is to be acted upon based on whether this ViewingPolicy is to be applied or removed from a policy Stack.

A ViewingPolicy object (e.g., one of ViewingPolicy objects 307A-307B) may associate one or more actions with a set of audiences (e.g., a distributor, a user, a household, a user device, users located in a zip code). These actions may comprise, for example, directing an audience to alternate content, restricting trick mode (e.g., trick play), restricting resolution, and/or other actions that are associated with an audience. These actions may also comprise information about ADS for a particular audience, or various advertisement conflicting rules for a particular audience. A ViewingPolicy may comprise an audience criteria that specifies a set of audiences (e.g., audience located at Location1). A ViewingPolicy may require that that if an audience meets an audience criteria, a corresponding action must be taken. SCTE 224 may maintain a list of actions. For example, the ViewingPolicy object 307A may comprise an action that directs an audience (e.g., the audience at Location1) to a specific content item.

An Audience object (e.g., one of Audience objects 309A-309C) may be a set of characteristics that define a subset of viewers based on certain attributes of their device types (e.g., tablets, phones, smart phones, laptop computers, personal computers, etc.), device characteristics (e.g., local storage, mobile, etc.), one or more distributors associated with the viewers, and/or geographical location information (e.g., zip codes, postal codes, latitude/longitude, market areas). An Audience object may indicate end user audiences and/or distributors that are associated with a content provider. An Audience object may receive categories such as "Distributor" or "Virtual Integrated Receiver Decoder (vIRD)." An audience object may comprise other Audience objects, which may result in compound audiences. Additionally, the logic to associate a client with an Audience may be based on matches of ANY, ALL, or NONE of the characteristics outlined, for easily including or excluding specific characteristics. For example, Match="ANY" for a list of zip codes may characterize the audience within that area defined by the list of zip codes. Match="NONE" may characterize an audience outside that area. For example, the Audience object 309 may define a set of viewers that are located either in zip code 80820 or 80821.

Figure 4:
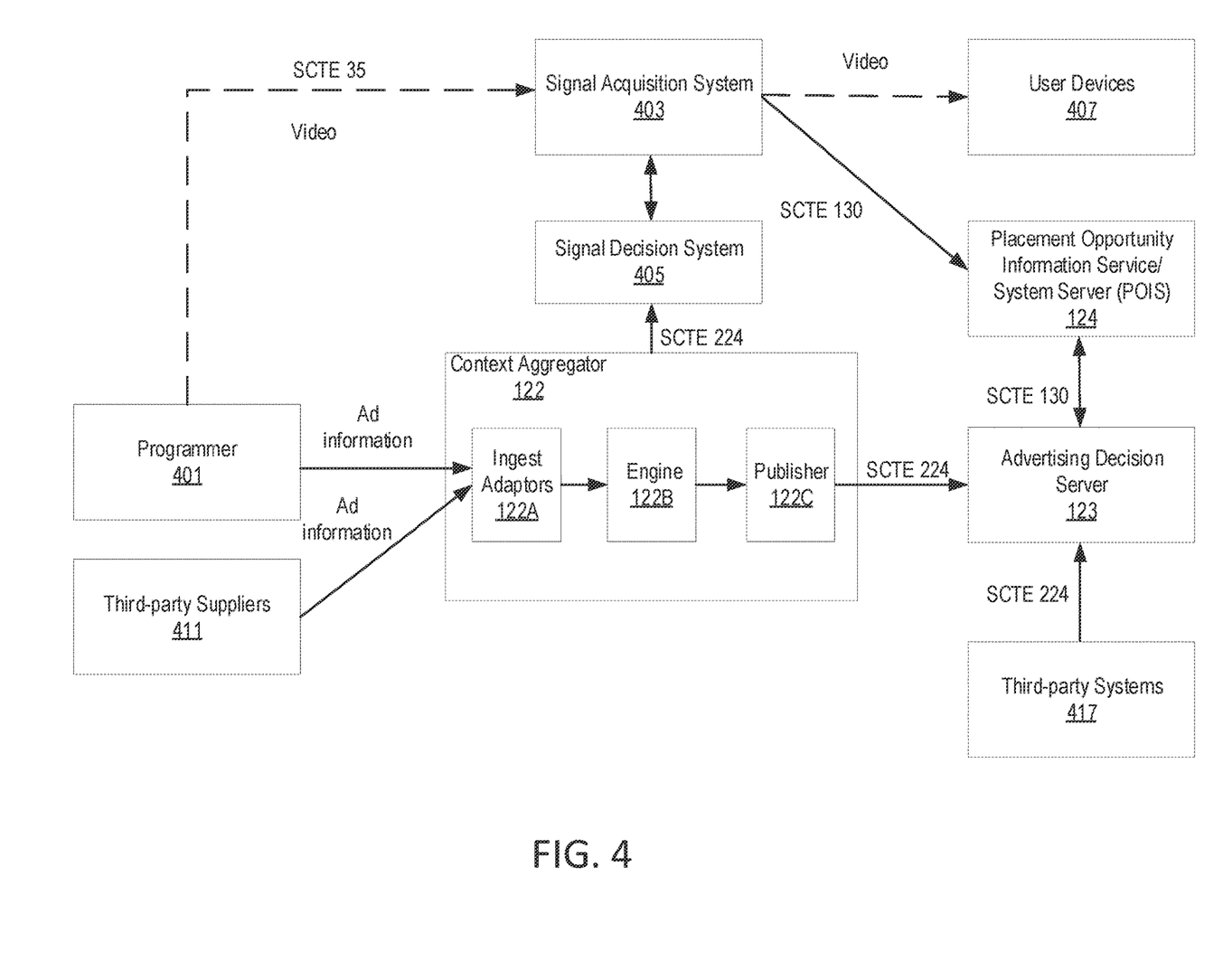
FIG. 4 shows an example diagram for a proposed modification to an addressable advertisement insertion interface.

FIG. 4 shows an example diagram for a proposed modification to an addressable advertisement insertion interface. SCTE 224 may be used to communicate rules and policies at an audience-based level. Within the addressable advertising workflow, a first decisioning point may be for the content provider and distributor to know which advertisements are addressable, within the content providers' 14-15 minutes of advertisement avails per hour. To do that, SCTE 224 may be used as the communication protocol between content providers, distributors, and advertising decision services. The content provider's advertisement schedule may be converted into the SCTE 224 XML language and distributed throughout the value chain in an SCTE 224 format.

In FIG. 4, the dotted lines may represent the transmission of a video stream and the solid lines may represent the transmission of metadata associated with the video stream. A programmer 401 may be a scheduling system associated with a content provider. The programmer 401 may send a video stream to a video signal acquisition system (SAS) 403. The SAS 403 may comprise one or more encoders, packagers, and/or manifest manipulators. The SAS 403 may send the received video stream to one or more user devices 407. The video stream may comprise one or more SCTE 35 markers (in-band signals). The video stream may comprise one or more advertisement breaks. An advertisement break may comprise one or more advertisement slots. An SCTE 35 marker/signal may identify an advertisement break and/or an advertisement slot. For example, an SCTE 35 marker/signal may identify the start and end times of an advertisement break and/or an advertisement slot.

A signal decision system (SDS) 405 may receive SCTE 224 messages from a context aggregator server 122. The SAS 403 and SDS 405 may be part of the context aggregator server 122. The context aggregator server 122 may comprise one or more ingest adaptors 122A. The one or more ingest adaptors 122A may be configured to ingest and aggregate different types of input information via a network. The input information may comprise program information and information associated with advertising or other content. The programmer 401 and the third-party suppliers 411 may send the input information in various formats. For example, the input information may be sent to the context aggregator server 122 in the formats of emails, texts, and/or spreadsheets.

The one or more ingest adaptors 122A may receive program information (e.g., metadata of the video stream) from the programmer 401 and information associated with advertising or other content from the programmer 401 or one or more third-party suppliers 411. The program information may comprise, for example, a name of a program, description of a program, a series number of a program, an episode number of a program, a genre of a program, actors of a program, a start and/or end time of a program, one or more identifiers that identify an advertisement break, an Industry Standard Coding Identification (ISCI) of an advertisement, a start time and/or end time of an advertisement break, and/or a duration of an advertisement break. The information associated with advertising or other content may comprise advertisement conflicting rules (e.g., advertisement inclusion rules, advertisement exclusion rules), episode specific information (e.g., guests, themes, locations), scene information (time of year, location, environment, activity, actors), and/or additional advertisement context information (e.g., category, brand, scene, theme, genre, duration, people, closed captioning).

The third-party suppliers 411 may comprise one or more advertising agencies and/or scheduling systems. The third-party suppliers 411 may send information associated with advertising or other content to the context aggregator server 122. For example, the third-party suppliers 411 may create advertisement conflicting rules for a program or a distributor, and send the advertisement conflicting rules to the context aggregator server 122.

The context aggregator server 122 may comprise an engine 122B and a publisher 122C. The engine 122B may normalize the input information and transform the normalized input information to an SCTE 224 format. For example, the engine 122B may generate one or more SCTE 224 messages by converting the input information into SCTE 224-based XML language. The conversion may comprise mapping different types of input information into the SCTE 224 format. The engine 122B may set or generate various types of SCTE 224 objects based on the generated one or more SCTE 224 messages.

The engine 122B may create a namespace for holding SCTE 224 metadata within the SCTE 224 Standard's schema. SCTE 224 metadata may be carried in a MetadataDetail container. Each SCTE 224 metadata entry may comprise 4 attributes as shown in Table 1 below.

TABLE 1

| Attribute | Data type | Description | Example |
|---|---|---|---|
| @name | Freetext | Name of the metadata | "ScheduledStart" |
| @provider | Freetext | Domain or name of source of data | nbc.com |
| @type | Enumeration(timestamp, boolean, string, integer) | Describes the format of the data in the "Value" field | "timestamp" |
| Value | Freetext aligns with @type | The metadata we are carrying | True |

Below is an example of a MetadataDetail container that may be added to a metadata section of a MediaPoints object:
<MetadataDetail name="ScheduledStart" provider="iNDemand" type="timestamp" xmlns="https://lrm.aor.theplatform.com/lrm/schemas/esni/224">2021-07-28T17:00:00Z</MetadataDetail>

The same metadata structure may be used to carry any additional metadata associated with advertising. Additionally or alternatively, different metadata structures may be used for the additional metadata associated with advertising. Table 2 shows example names of the SCTE-224 metadata for additional metadata associated with advertising.

TABLE 2

| Metadata type | Name of the SCTE-224 metadata |
|---|---|
| Show name | Title |
| Show description | Description |
| Series number | Series# |

TABLE 2-continued

| Metadata type | Name of the SCTE-224 metadata |
| --- | --- |
| Episode number | Episode# |
| Show Genre | Genre |
| Show Actors | Characters |
| Start time | ScheduledStart |
| End time | ScheduledEnd |
| Advertisement identifier | Ad-id |
| ISCI | ISCI |
| Advertisement break start | ScheduledStart |
| Advertisement break end | ScheduledEnd |
| Advertisement break duration | Duration |
| Advertisement inclusion rule | Conflict: inclusion |
| Advertisement exclusion rule | Conflict: exclusion |
| Guests in an episode | Show: Guests |
| Theme of an episode (e.g., holiday party) | Show: Theme |
| Location associated with an episode (e.g., New York City) | Show: Location |
| Time of year of a scene (e.g., winter, summer, Christmas) | Scene: Season |
| Location of a scene (e.g., beach, mountain, Colorado) | Scene: Location |
| Environment of a scene (e.g., sand, snow, rain) | Scene: Environment |
| Activity of a scene (e.g., driving a car, drinking soda, playing golf) | Scene: Activity |
| Actors of a scene | Scene: Actors |
| Advertisement category (e.g., Fast-food, car sales, insurance, travel, health) | Ad: Category |
| Advertisement brand (e.g., Burger King, Ford, Progressive) | Ad: Brand |
| Advertisement scene (e.g., beach, car, SUV, truck) | Ad: Scene |
| Advertisement theme (e.g., mountain driving, adventure, Hudson river) | Ad: Theme |
| Advertisement genre (e.g., product, promo, charity donations) | Ad: Genre |
| Advertisement duration (e.g., PT1M, PT30S) | Ad: Duration |
| Advertisement people (e.g., School bus driver, Brad Pitt) | Ad: People |
| Advertisement closed captioning (e.g., true or false) | Ad: CC |

The context aggregator server 122 may store the SCTE 224 messages in a local database or via a cloud service. The context aggregator server 122 may monitor the ingestion status of the input information and the generation of the SCTE 224 messages. The publisher 122C may publish the SCTE 224 messages to other devices and/or services. For example, the publisher 122C may send the SCTE 224 messages to the SDS 405. The SDS 405 may receive the SCTE 224 messages. In addition, the publisher 122C may send the SCTE 224 messages to one or more ADSs 123. Different types of the SCTE 224 messages may be sent to different ADSs 123 of different distributors/operators (e.g., advertising company). For example, SCTE 224 messages that comprise information identifying which advertisement slots are addressable may be sent to a distributor, SCTE 224 messages that comprise information identifying advertisement rules may be sent to an advertising company (e.g., FreeWheel), and/or SCTE 224 messages that comprise addressability rules and audit and execution information (e.g., auditing/monitoring advertisement logs, quality information/CPM values on advertisements being played out, etc.) may be sent to a different advertising company (e.g., Canoe). The ADSs 123 may determine an advertisement for output based on the SCTE 224 messages and/or other information obtained from third-party systems 417. The third-party systems 417 may provide additional information associated with the advertising. For example, the third-party systems 417 may provide demographics of the viewers located in a region and advertisement campaign information for a particular advertisement.

The SAS 403 may detect one or more SCTE 35 markers/signals in the video stream. If the SAS 403 detects an SCTE 35 marker/signal for the start of an advertisement break, the SAS 403 may call (e.g., send a message to) the SDS 405 to check if the advertisement break comprises an addressable advertisement slot, for example, via an event signaling and management (ESAM) API. For example, the SAS 403 may call the SDS 405 to determine the actions associated with the advertisement break identified by the SCTE 35 marker/signal. If the SAS 403 calls the SDS 405, the SAS 403 may inform the SDS 405 of which source (e.g., content provider) it was on, what time it detects the SCTE 35 marker/signal, the binary signal, and/or client characteristics. The SAS 403 may send a message comprising information such as "I just saw the signal 'UhJeasfojoihe23edde' on source XYZ, at 1:00 pm and I am encoding for zip code 80820." The SDS 405 may check all the received SCTE 224 messages and their Media objects (e.g., the Media object 301) to find at least one Media object for the same source (e.g., XYZ).

Based on the SDS 405 finding a Media object that comprises the same source, the SDS 405 may examine the MediaPoints objects (e.g., the MediaPoints objects 303A-303D) associated with the Media object to find MediaPoints objects that fall within the designated time window. Based on the SDS 405 obtaining the list of MediaPoints objects that fall within the designated time window, the SDS 405 may evaluate each MediaPoints object to see if there is a match for the SCTE 35 marker/signal. For a MediaPoint object that matches, the SDS 405 may either "apply" or "remove" the Policy object associated with the MediaPoint object. The SDS 405 may check the ViewingPolicy object associated with the Policy object. The SDS 405 may determine whether a match exists between the audience and the designated zip code, based on the Match criteria. For example, if a match exists between the audience and the designated zip code, the SDS 405 may return the "Action" of the ViewingPolicy object to the SAS 403 for that audience. In the case of alternate content, for example, the SDS 405 may inform the SAS 403 that it needs to switch over to another source and start encoding the other source.

In addition, the SDS 405 may check the corresponding MediaPoint object to "apply" the policy and validate the distributor against the ViewingPolicy Audience and resulting action. For example, if the distributor is "ABC" and "ABC" is in the content provider's audience, and the action is linear digital advertisement insertion (DAI), the advertisement break may comprise an addressable advertisement slot. In that case, the SDS 405 may return the "LinearDAI" back to the SAS 403 as the decision response, so that the SAS 403 may be informed that the advertisement break comprises an addressable advertisement slot. The SAS 403 may call the POIS server 124 to obtain an advertisement to play using, for example, SCTE 130 type messages. The POIS server 124 may send to the ADS 123 information (e.g., advertisement break identification, demographics of viewers), for example, using SCTE 130 type messages. The POIS server 124 may receive an advertisement from the ADS 123, for example, based on SCTE 130 type messages. If the distributor is, for example, "DEF" and is not in the content provider's audience, the SDS 405 may return a message to the SAS 403 indicating that there is no placement opportunity (e.g., "no opportunity" or "noop"), which may ask the SAS 403 to do nothing and/or keep doing what it was doing. In some examples, the SAS 403 may output the baked-in advertisement (e.g., originally scheduled advertisement). There may be other actions like "SignalDeletion."

Figure 5A:
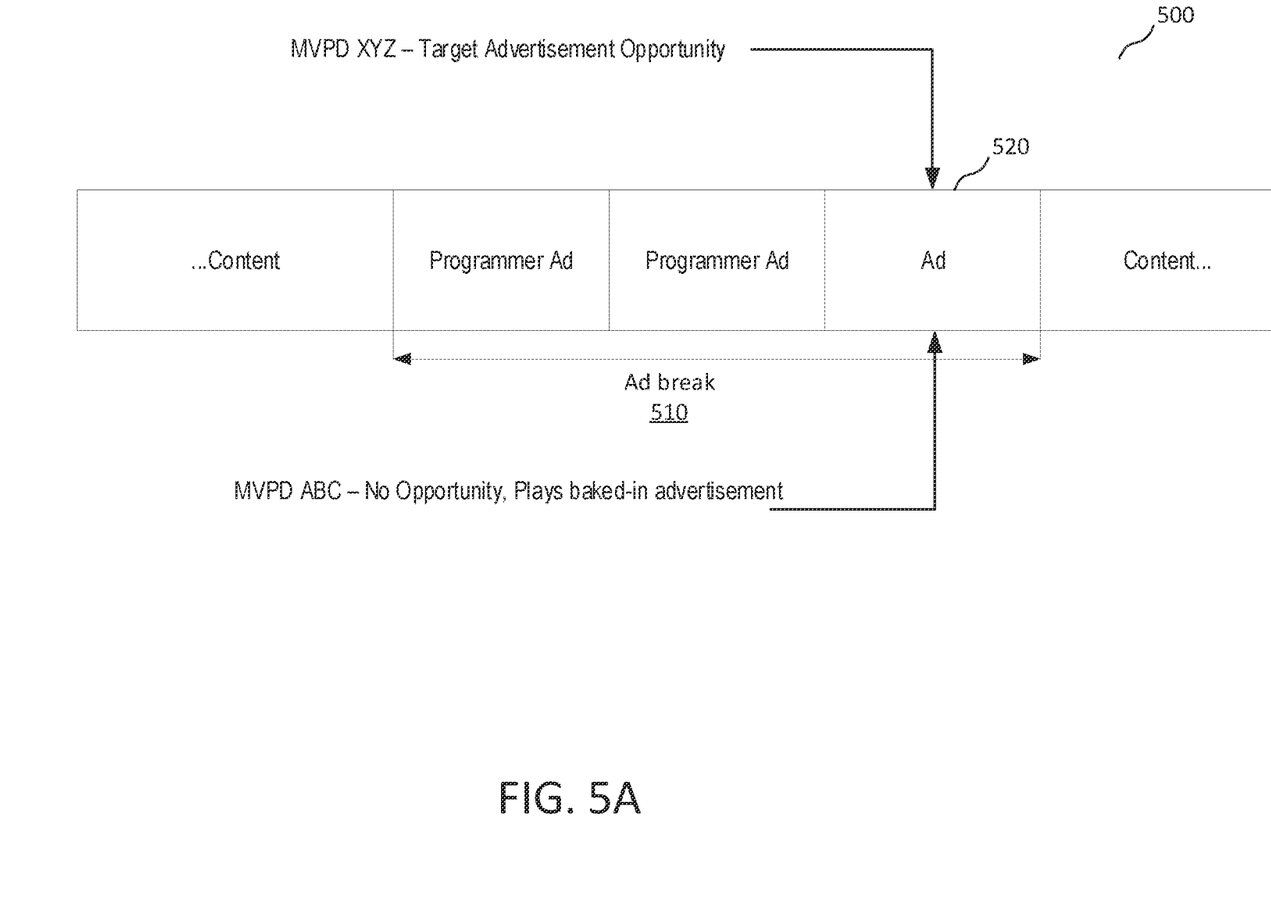
FIG. 5A shows examples of addressable advertisement slots.

FIG. 5A shows examples of addressable advertisement slots. In FIG. 5A, a video stream 500 may comprise an advertisement break 510. The advertisement break 510 may comprise an advertisement slot 520. The video stream 500 may comprise an SCTE 35 marker/signal that identifies the start of the advertisement break 510 and/or the start of the advertisement slot 510. If the SAS 403 detects an SCTE 35 marker/signal for the start of the advertisement slot 510, the SAS 403 may call the SDS 405 to check if the advertisement slot 510 is an addressable advertisement slot. For example, the SDS 405 may check, based on a received SCTE 224 message, a corresponding MediaPoint object (e.g., the MediaPoint object 303A-303D) and determine that the distributor is "XYZ," and the SDS 405 may validate the distributor against the ViewingPolicy Audience and determine that the distributor "XYZ" is in the content provider's audience and that the action is linear digital advertisement insertion (DAI). Based on a determination that the distributor "XYZ" is in the content provider's audience, and that the action is linear DAI, the SDS 405 may determine that the advertisement slot 510 is an addressable advertisement slot. As another example, the SDS 405 may check the corresponding MediaPoint object (e.g., the MediaPoint object 303A-303D) and determine that the distributor is "ABC." If the SDS 405 determines that the distributor "ABC" is not the content provider's audience, the SDS 405 may determine that the advertisement slot 510 is not an addressable advertisement slot and that there is no placement opportunity. The SAS 403 may receive information from the SDS 405 indicating that there is no placement opportunity and a baked-in advertisement should be output.

One benefit of using out-of-band SCTE 224 messages/objects associated with addressable advertisement(s) may be that SCTE 224 messages/objects may carry potentially unlimited information to match audience and action pairs. Because the signaling happens out-of-band, the SCTE 224 messages/objects may not impact the frames in the video by trying to cram everything into an SCTE 35 marker/signal, so it greatly reduces the size of the SCTE 35 marker/signal required with the video. In fact, SCTE 224 messages/objects may allow a single, simple SCTE 35 marker/signal to be sent to multiple distributors and have multiple meanings, which results in individual playout payloads to multiple distributors. Because content providers innately serve multiple distributors and audiences, this is a highly desirable feature.

SCTE 224 messages/objects may provide specific advertisement rules for the addressable inventory on behalf of the content provider to the distributor and the ADSs. There may be many advertisement rules, but two constitute the main rules conveyed from the content provider to the distributor. One advertisement rule may involve which ADS to use, whether there are campaign/order codes associated with that slot that the ADS needs to know. The second advertisement rule may involve advertisement inclusion and exclusion, or whether there are conflicting rules, based on what advertisements the content provider already has slotted in its linear feed. In this case, a protocol like SCTE 224 may facilitate the appropriate advertising decisioning without instigating advertisement conflict resolution. Each of these types of advertisement rules may easily be carried by SCTE 224 and conveyed to an operator by or for the content provider, on a per-distributor basis.

Because SCTE 224 type information may be sent out-of-band and may be used differently for different distributors, a content provider may set up different ADS s (e.g., the ADS 123) for each distributor. For example, a content provider may use an SCTE 224 MediaPoint that has a Policy for audience "Comcast," and action "use FreeWheel" and another distributor with audience "Charter" and action "use Google DFP." In this way, a content provider may instruct different distributors to use different ADSs.

Additionally, because a content provider may have individual direction capability for different distributors, the content provider may direct more than just which ADS to use. A content provider may include varying order numbers or varying campaign attributes that are different for each distributor. This may result in a tighter coupling of addressable advertisements and the distributor, leading to potentially higher revenue upsells.

Because the SCTE 224 signal path is out-of-band, there is no limit of a size of an SCTE 224 message. As a result, a content provider may use one or more SCTE 224 messages to include extensive metadata about an advertisement, or what targeted advertisement(s) cannot be used to avoid placing an advertisement within the same advertisement break that conflict with one another. Because the content provider knows about the baked-in advertisements in the feed, the content provider may provide rules to the distributor or one or more ADS about what advertisements would fit great in the advertisement slot. For example, a content provider may provide rules specifying which advertisements to include. Additionally or alternatively, a content provider may provide rules specifying which type or category of advertisements not to include (to exclude), because they may counter or otherwise affect the previous or consequent advertisement that had been identified as addressable. For example, a content provider may provide a rule to exclude Pepsi advertisements after Coke advertisements or vice versa.

Figure 5B:
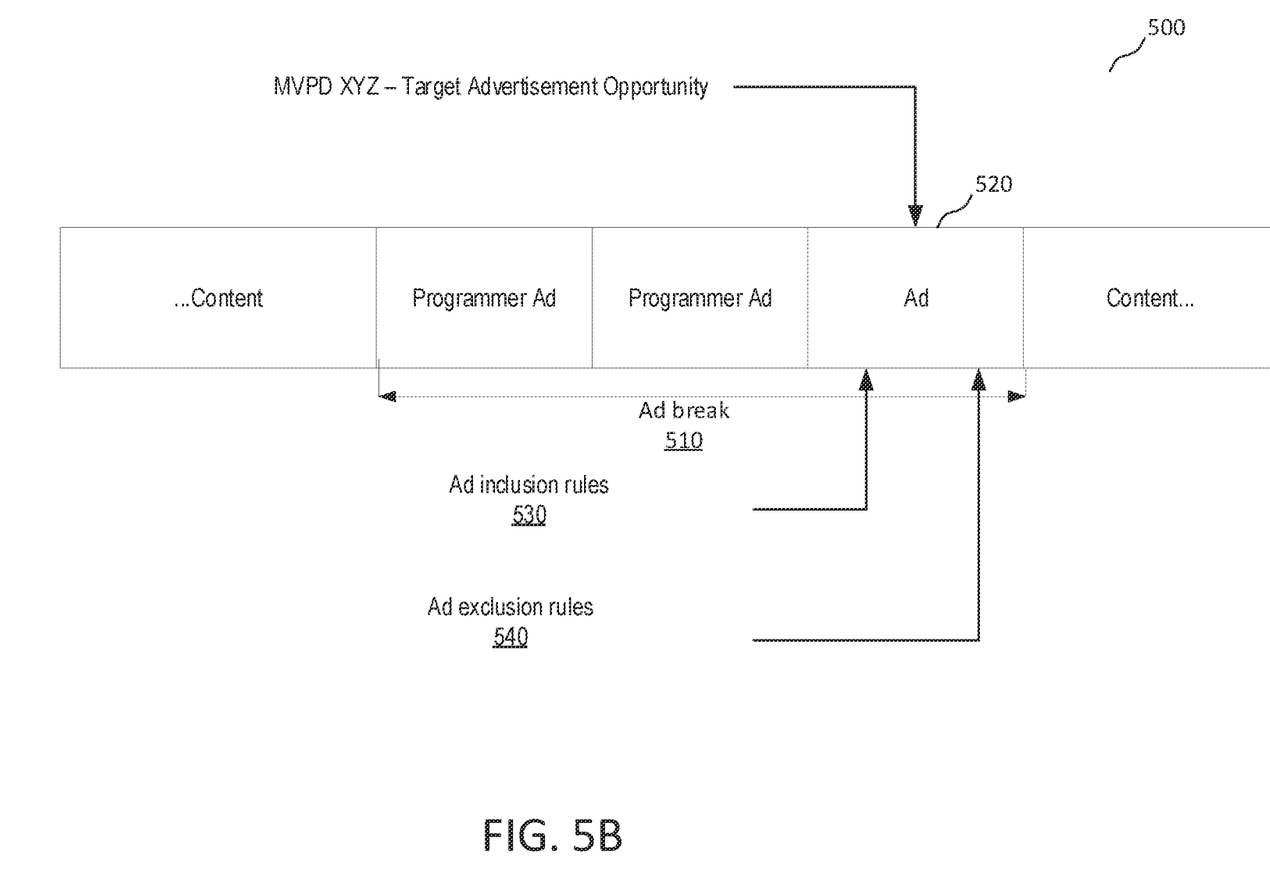
FIG. 5B shows example advertisement rules associated with an advertisement insertion interface.

FIG. 5B shows example advertisement rules associated with an advertisement insertion interface. For example, an SCTE 224 message may provide advertisement inclusion rules 530. The advertisement inclusion rules 530 may comprise the insertion of one or more specific advertisements or specific types of advertisement (e.g., truck advertisement). An SCTE 224 message may provide advertisement exclusion rules 540. The advertisement exclusion rules 540 may comprise the exclusion of one or more specific advertisements or specific types of advertisement. For example, the advertisement exclusion rules 540 may exclude Pepsi advertisements and fast food advertisements.

Examples of these rules may include, but are not limited to, the following: showing a specific number of advertisements or limiting the number of advertisement slots for a specific product group, specifying a minimum spacing between advertisements belonging to a specific product group, specifying that an advertisement slot may only be replaced by campaigns that are a member of a specific product category, and/or excluding particular products or categories that might not align with other advertisements in the advertisement slot. For example, one rule may specify that a brand A, a soda advertisement, and a brand B, another soda advertisement, may not appear in the same advertisement slot. As another example, one rule may specify that a national car advertisement cannot be followed by a local car dealer advertisement. As another example, one rule may specify that an insurance advertisement may not be placed into every advertisement slot.

Because of their aforementioned large capacity and flexibility, SCTE 224 messages may carry information about the advertisements or the content associated with the addressable advertisement. For example, SCTE 224 messages may comprise scene information, actors or other action-based on information, advertisement creative information, and/or technical advertisement metrics information.

Scene information may comprise information that describes or otherwise indicates the scenes shown before or in response to an advertisement slot (e.g., adjacent to an advertisement slot). Advertisement campaigns may be set up on overarching show genre, category, or age group, but if a content provider could convey more information at the scene level, it could be that much more valuable for the advertisement slot. For example, the scene information may indicate what was viewed by the audience in the last scene (e.g., a car chase scene) before a break. Tying the next advertisement to that visual context, and scheduling into the next appropriate advertisement break (e.g., a car dealer advertisement in response to a car chase scene) may maximize effectiveness. For example, if the last scene viewed by the audience was beach scene with a truck, beach related advertisements may be played when the audience's zip code is closer to beach areas. Alternatively, truck related advertisements may be played when the audience's zip code is closer to mountain areas. This linkage could lead to greater CPM values.

Actors or other action-based metadata may comprise actor information or action-related information of a content item. Product placement or metadata derived from action within a show (either live or pre-recorded) could be used to drive more intelligent advertisements and higher CPMs. An example of actors or other action-based metadata may comprise names or other information of one or more actors in a content item or additional scene information.

Advertisement creative metadata may comprise information associated with other advertisements. For example, using metadata from the previous advertisement or other advertisements from the advertisement slot could lead to a more intelligent advertisement break and higher CPM.

Technical advertisement metrics may comprise a duration of an advertisement. For example, data such as advertisement duration may be used to ensure advertisement slots are not missed, which could result in loss of revenue for the content providers and distributors.

Figure 6A:
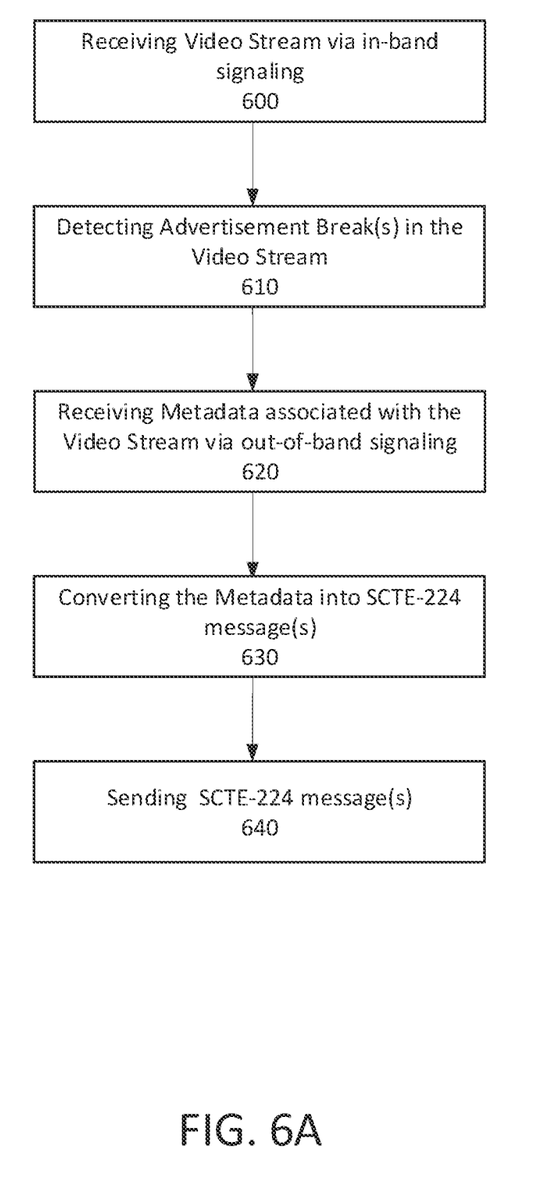
FIGS. 6A and 6B show examples of flow charts showing steps of example methods.
Figure 6B:
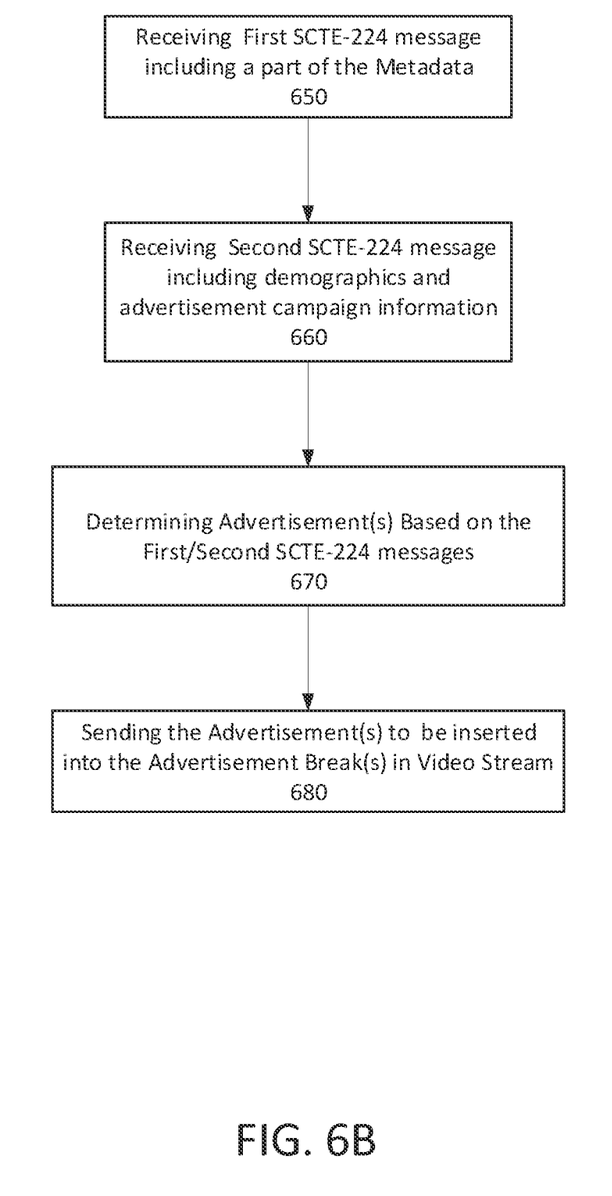

FIGS. 6A and 6B show examples of flow charts showing steps of example methods. FIG. 6A is described by way of an example in which the steps are performed by the context aggregator server 122. FIG. 6B is described by way of an example in which the steps are performed by ADS 123. One, some, or all steps of an example method of 6A, or portions thereof, may be performed by one or more other computing devices (e.g., the context aggregator server 122, SAS 403, ADS 405, etc.). One, some, or all steps of an example method 6B, or portions thereof, may be performed by one or more other computing devices (e.g., ADS 123, POIS server 124, third-party systems 417, etc.). One, some, or all steps of the example methods of 6A and 6B may be omitted, performed in other orders, and/or otherwise modified, and/or one or more additional steps may be added.

At step 600, the context aggregator server 122 may receive, via in-band communication, a video stream from the programmer 401. The video stream may include at least a program and a marker (e.g., SCTE 35 signal) indicating an advertisement break in the program. At step 601, the context aggregator server 122 may detect the advertisement break in the video stream. The advertisement break may be associated with an addressable/replaceable advertisement slot (e.g., a baked-in advertisement may be replaced with a local-level advertisement) or an irreplaceable advertisement slot reserved for the baked-in advertisement (e.g., national advertisement).

At step 620, the context aggregator server 122 may receive, via out-of-band signaling, metadata associated with the video stream from the programmer 401 and/or the third-party suppliers 411. The metadata may include information associated with addressable/replaceable advertisement slots, advertisement rules, audit/execution information (auditing/monitoring advertisement logs, quality information/CPM values on advertisements being played out, etc.), or context information of the program. The context information may include a program name, a program description, a program series number, a program episode number, a program genre, program actors, a program start time, a program end time, advertisement identifier, an Industry Standard Coding Identification (ISCI) of an advertisement, advertisement break start time, advertisement break end time, advertisement break duration, advertisement inclusion rule, advertisement exclusion rule, guests in a program episode, theme of a program episode (e.g., holiday party), a geographical location (e.g., New York City) associated with a program episode, a season of a program scene (e.g., winter, summer, Christmas, etc.), a type of location of a program scene (e.g., beach, mountain, outer space, metropolitan city, etc.), an environment of a program scene (e.g., sand, snow, rain, etc.), an activity of a program scene (e.g., driving a car, drinking soda, playing golf, etc.), actor roles of a program scene (e.g., policeman, firefighters, soldiers, students, teachers, school bus driver, presidential candidates, etc.), advertisement category (e.g., fast-food, car sales, insurance, travel, health, etc.), advertisement brand (e.g., McDonald's, Ford, Progressive, etc.), advertisement scene (e.g., beach, car, SUV, truck, etc.), advertisement theme (e.g., mountain driving, adventure, Hudson river, serving in the US Army, etc.), advertisement genre (e.g., product, promo, charity donations, political campaign, etc.), advertisement people (e.g., Ronald Reagan, Larry King, Brad Pitt, etc.), or advertisement closed captioning (e.g., on or off).

At step 630, the context aggregator server 122 may convert the metadata into SCTE-224 message(s). For example, SCTE-224 message may be XML messages with various fields (e.g., media, media points, policy, viewing policy, audiences, etc.). For example, a media field may describe a channel (e.g., WNBC), source information for the channel, and include an ordered list of media point fields. A media point field may describe a time-based point or a SCTE 35 marker-based point in the media field where a decision/action needs to be taken. A policy field may include a set of viewing policy fields to be acted upon. A viewing policy field may associate a number of actions with a set of audience fields (e.g., a distributor, a user, a household, a user device, users located in a zip code). An audience field may include a set of characteristics defining a subset of viewers (e.g., device characteristics, advertisement distributor(s) associated with viewers, or location information).

At step 640, the context aggregator server 122 may send SCTE-224 message(s) of different types, for example, to different ADSs 123. For example, SCTE-224 message(s) including information identifying advertisement rules for addressable advertisement slots may be sent to a first ADS 123 associated with a first advertising company/distributor (e.g., FreeWheel). For example, SCTE-224 message(s) including audit and execution information may be sent to a second ADS 123 associated with a second advertising company/distributor (e.g., Canoe).

At step 650 (FIG. 6B), ADS 123 may receive a first SCTE-224 message including a part of the metadata, for example, from the context aggregator server 122. At step 660, ADS 123 may receive a second SCTE-224 message, for example, from the third-party systems 417 (e.g., a third-party server). For example, the second SCTE-224 message may include demographics of viewers located in a region and advertisement campaign information. At step 670, ADS 123 may determine, based on the first and second SCTE-224 messages, advertisement(s). For example, the first SCTE-224 message may be associated with an advertisement rule based on a type of location of a program scene (e.g., mountain) and the second SCTE-224 message may indicate age (e.g., millennials), economic characteristics (e.g., middle class) of viewers located in a region (e.g., Colorado). The second SCTE-224 message may also include advertisement campaign information for automobile sales. ADS 123 may determine for midsize SUV advertisements. At step 680, ADS 123 may send, for example, to an advertising company/distributor (e.g., FreeWheel), the advertisement(s) to be inserted into the advertisement break(s) in the video stream.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
  receiving, by a server via a first channel, a video stream comprising a marker that indicates a break for inserting at least one advertisement in the video stream;
  receiving, via a second channel different from the first channel, metadata that indicates a plurality of rules associated with insertion of at least one advertisement into the break and that indicates context information associated with selection of the at least one advertisement;
  converting the plurality of rules and the context information to a format associated with a plurality of advertisement distributors;
  sending, to a first advertising decision server associated with a first advertisement distributor of the plurality of advertisement distributors, a first portion of the converted context information and a converted first rule, of the converted plurality of rules; and
  sending, to a second advertising decision server associated with a second advertisement distributor of the plurality of advertisement distributors, a second portion of the converted context information and a converted second rule, of the converted plurality of rules, wherein the first portion of the converted context information is different from the second portion of the converted context information, and wherein the converted first rule is different from the converted second rule.

2. The method according to claim 1, further comprising:
  receiving a Society of Cable Telecommunications Engineers (SCTE) standard 35 (SCTE-35) signal; and
  identifying, based on the SCTE-35 signal, the marker in the video stream.

3. The method according to claim 1, wherein:
  sending the converted first rule comprises sending a first Society of Cable Telecommunications Engineers (SCTE) standard 224 (SCTE-224) message comprising a first portion of the received metadata; and
  sending the converted second rule comprises sending a second SCTE-224 message comprising a second portion of the received metadata.

4. The method according to claim 1, further comprising:
  determining, based on one of the plurality of rules, that the break in the video stream is available for replacing a baked-in advertisement with another advertisement.

5. The method according to claim 1, wherein the converted first rule indicates that the break in the video stream is for a baked-in advertisement.

6. The method according to claim 1, wherein the converted first rule comprises instructions configured to cause the first advertising decision server to:
  select, based on geographical location information of a scene in the video stream and audiences of the first advertisement distributor, an advertisement; and
  insert the advertisement into the break in the video stream.

7. The method according to claim 1, wherein the converted first rule comprises instructions configured to cause the first advertising decision server to:
  select, based on the converted first rule and the first portion of the converted context information, a first advertisement; and
  insert the first advertisement into the break in the video stream, and
  wherein the converted second rule comprises instructions configured to cause the second advertising decision server to:
  select, based on the converted second rule and the second portion of the converted context information, a second advertisement different from the first advertisement; and
  insert the second advertisement into the break in the video stream.

8. The method according to claim 1, wherein the video stream comprises a program and the context information comprises at least one of a program name, a program description, a program series number, a program episode number, a program genre, program actors, a program schedule, advertisement identifier, an Industry Standard Coding Identification (ISCI) of an advertisement, advertisement schedule, program guests, theme of a program episode, a geographical location of a program episode, a season of a program scene, a type of location of a program scene, an environment of a program scene, an activity of a program scene, actors of a program scene, advertisement category, advertisement brand, advertisement scene, advertisement theme, advertisement genre, advertisement people, or advertisement closed captioning.

9. The method according to claim 1, wherein:
  receiving the video stream comprises receiving the video stream via an in-band communication; and
  receiving the metadata comprises receiving the metadata via an out-of-band communication.

10. The method according to claim 1, wherein the format corresponds to a first Society of Cable Telecommunications Engineers (SCTE) standard 224 (SCTE-224) message that comprises at least one of:
  information identifying addressable advertisement slots;
  information identifying advertisement rules;
  audit and execution information;

demographics of viewers located in a region; or
advertisement campaign information associated with an advertisement.

11. A method comprising:
receiving, by a server, a video stream comprising a marker that indicates a break for inserting at least one advertisement into the video stream;
receiving metadata that indicates a plurality of rules associated with insertion of at least one advertisement into the video stream, wherein each rule of the plurality of rules indicates an advertising decision server for an advertisement distributor of a plurality of advertisement distributors, wherein the plurality of rules indicate different advertising decision servers for different advertisement distributors; and
sending, based on the metadata and to a first advertisement distributor of the plurality of advertisement distributors, a first Society of Cable Telecommunications Engineers (SCTE) standard 224 (SCTE-224) message associated with a first rule, of the plurality of rules, indicating a first advertising decision server.

12. The method of claim 11, further comprising:
sending, based on the metadata and to a second advertisement distributor of the plurality of advertisement distributors, a second SCTE-224 message associated with a second rule, of the plurality of rules, indicating a second advertising decision server.

13. The method according to claim 11, further comprising:
receiving an SCTE standard 35 (SCTE-35) message; and
identifying, based on the SCTE-35 message, the marker in the video stream.

14. The method according to claim 11, wherein the first SCTE-224 message comprises at least one of:
information identifying addressable advertisement slots;
information identifying advertisement rules;
audit and execution information;
demographics of viewers located in a region; or
advertisement campaign information associated with an advertisement.

15. The method according to claim 11, further comprising:
determining, based on one of the plurality of rules, that the marker is associated with an addressable advertisement slot for replacing a baked-in advertisement with another advertisement.

16. The method according to claim 11, further comprising:
determining, based on one of the plurality of rules, that the marker is associated with an unaddressable advertisement slot reserved for a baked-in advertisement.

17. The method according to claim 11, wherein the first rule comprises instructions configured to cause the first advertising decision server to:
select, based on geographical location information associated with viewers of the first advertisement distributor, an advertisement, wherein the geographical location information includes at least one of zip codes, postal codes, latitude/longitude, or market areas; and
insert the advertisement into the break in the video stream.

18. A method comprising:
receiving, by an advertising decision server associated with an advertisement distributor of a plurality of advertisement distributors and from a context aggregator server, a first Society of Cable Telecommunications Engineers (SCTE) standard 224 (SCTE-224) message comprising a first advertisement rule indicating the advertisement distributor;
receiving, by the advertising decision server and from a third server, a second SCTE-224 message indicating at least demographics of viewers in a region and advertisement campaign information; and
determining, based on the first SCTE-224 message and the second SCTE-224 message, a first advertisement for inserting into a first advertisement break in a video stream.

19. The method according to claim 18, wherein the first advertisement rule is associated with geographical location information of a scene in the video stream, the method further comprising:
selecting, based on the geographical location information and audiences of the advertisement distributor, a second advertisement; and
inserting the second advertisement into a second advertisement break in the video stream.

20. The method according to claim 18, wherein the first advertisement rule is associated with duration information associated with a second advertisement break in the video stream, the method further comprising:
selecting, based on the duration information, a second advertisement; and
inserting the second advertisement into the second advertisement break in the video stream.

* * * * *